(12) United States Patent
Mothier (10) Patent No.: US 12,347,903 B2
(45) Date of Patent: Jul. 1, 2025

(54) THERMAL MANAGEMENT SYSTEM FOR A FUEL CELL VEHICLE

(71) Applicant: Volvo Truck Corporation, Gothenburg (SE)

(72) Inventor: Ronan Mothier, Dizimieu (FR)

(73) Assignee: Volvo Truck Corporation, Gothenburg (SE)

( * ) Notice: Subject to any disclaimer, the term of this patent is extended or adjusted under 35 U.S.C. 154(b) by 560 days.

(21) Appl. No.: 17/800,272

(22) PCT Filed: Feb. 24, 2020

(86) PCT No.: PCT/EP2020/054797
§ 371 (c)(1),
(2) Date: Aug. 17, 2022

(87) PCT Pub. No.: WO2021/170213
PCT Pub. Date: Sep. 2, 2021

(65) Prior Publication Data
US 2023/0104670 A1    Apr. 6, 2023

(51) Int. Cl.
*H01M 8/04746*    (2016.01)
*B60H 1/00*    (2006.01)
(Continued)

(52) U.S. Cl.
CPC .... *H01M 8/04768* (2013.01); *B60H 1/00278* (2013.01); *B60H 1/00314* (2013.01);
(Continued)

(58) Field of Classification Search
CPC ......... H01M 8/04768; H01M 8/04629; H01M 8/04358; H01M 8/04723; H01M 16/006;
(Continued)

(56) References Cited

U.S. PATENT DOCUMENTS

| 5,537,956 A | 7/1996 | Rennfeld et al. |
| 6,394,207 B1 | 5/2002 | Skala |

(Continued)

FOREIGN PATENT DOCUMENTS

| EP | 2977254 A1 | 1/2016 |
| KR | 20130064431 A | 6/2013 |
| WO | 2017092853 A1 | 6/2017 |

OTHER PUBLICATIONS

International Search Report and Written Opinion for International Patent Application No. PCT/EP2020/054797, mailed Nov. 4, 2020, 11 pages.

*Primary Examiner* — Christopher P Domone
(74) *Attorney, Agent, or Firm* — Withrow & Terranova, PLLC (57) ABSTRACT

It is proposed a thermal management system for a fuel cell vehicle comprising: a first cooling circuit filled with a first coolant, having at least a first pump, a second cooling circuit filled with a second coolant, having at least a second pump, a third cooling circuit filled with a third coolant, having at least a third pump, wherein the first, second and third cooling circuits are fluidically independent from one another, wherein there is provided at least a selective heat exchanger arrangement, for selectively coupling thermally the third cooling circuit with the first cooling circuit and/or with the second cooling circuit, under predefined conditions.

15 Claims, 8 Drawing Sheets

(51) Int. Cl.
  *B60H 1/22*         (2006.01)
  *H01M 8/04029*      (2016.01)
  *H01M 8/0432*       (2016.01)
  *H01M 16/00*        (2006.01)
  *B60L 58/32*        (2019.01)

(52) U.S. Cl.
  CPC ....... *B60H 1/00885* (2013.01); *B60H 1/2221* (2013.01); *H01M 8/04029* (2013.01); *H01M 8/04358* (2013.01); *H01M 16/006* (2013.01); *B60H 2001/00307* (2013.01); *B60L 58/32* (2019.02); *H01M 2250/20* (2013.01)

(58) Field of Classification Search
  CPC ........... H01M 2250/20; B60H 1/00278; B60H 1/00885; B60L 58/32; B60L 58/33
  See application file for complete search history.

(56) References Cited

U.S. PATENT DOCUMENTS

| | | |
|---|---|---|
| 2010/0273079 A1 | 10/2010 | Hinsenkamp et al. |
| 2016/0164117 A1 | 6/2016 | Na et al. |
| 2019/0123406 A1 | 4/2019 | Yamamura |
| 2019/0375270 A1* | 12/2019 | Boger ................ B60H 1/00392 |

* cited by examiner

THERMAL MANAGEMENT SYSTEM FOR A FUEL CELL VEHICLE

This application is a 35 USC 371 national phase filing of International Application No. PCT/EP2020/054797, filed Feb. 24, 2020, the disclosure of which is incorporated herein by reference in its entirety.

TECHNICAL FIELD

This disclosure pertains to the field of thermal management systems for a fuel cell powered electric vehicle. This disclosure is directed to systems and methods to control the temperature of the fuel cells and other components of the vehicle whatever the outside temperature and demand for motive power. This disclosure also relates to an automotive vehicle equipped with such a system.

BACKGROUND ART

In a fuel cell powered electric vehicle, fuel cells are used to generate electrical energy from hydrogen. That electrical energy is then either directly converted to movement via an electric motor coupled to traction wheels, or temporally stored in a battery.

Operating high efficiency fuel cells requires proper temperature control. Optimal fuel cell operation occurs within a relatively high temperature range. However, during such fuel cell operation, additional heat is generated as a by-product of the reactions occurring within the fuel cells.

In parallel, other vehicle components have different temperature requirements. The battery must initially be heated to efficiently start the vehicle. During operation, both the battery and power electronics, provided to control fuel cell and battery operation, have relatively low temperature ranges. However, these components also generate heat. In addition, the vehicle is also equipped with a heating, ventilation and cooling system (HVAC), for passenger comfort, which requires heat.

Therefore, a major challenge in the production of fuel cell powered electronic vehicles is providing a suitable thermal management system. The thermal management system must efficiently transfer heat to and/or away from the abovementioned components to maintain them in their ideal operating temperature range.

It has been proposed, for example in U.S. Pat. No. 6,394,207, to provide two heat transfer circuits. A first, high temperature heat transfer circuit is used to generate steam. A second, low temperature heat transfer circuit is provided to cool the fuel cells, battery, electric motor and power electronics. Both circuits are connected to each other by valves.

In this system, it appears particularly challenging to maintain the second coolant at a relatively low temperature. Indeed, the low temperature circuit is thermally coupled to a number of heat generating components, and a powerful fan and radiator arrangement may be required for suitable operation. Thus, the cost, size and weight of the thermal management system may be compromised.

It has also been proposed a system comprising of three interconnected circuits. However, all circuits must be filled with the same coolant. This prevents using adapted coolants for different circuits to optimize heat exchanges.

The aim of the invention is to propose a thermal management system, particularly for a fuel cell powered vehicle, which does not present at least some of the disadvantages of the above prior art.

SUMMARY

It is proposed a thermal management system for a vehicle comprising at least one fuel cell, the system comprising:
- a first cooling circuit filled with a first coolant, having at least a first pump,
- a second cooling circuit filled with a second coolant, having at least a second pump,
- a third cooling circuit filled with a third coolant, having at least a third pump,
- wherein the first, second and third cooling circuits are fluidically independent from one another,
- wherein there is provided at least a selective heat exchanger arrangement, for selectively coupling thermally the third cooling circuit with the first cooling circuit and/or with the second cooling circuit, under predefined conditions.

Thus, each circuit may be adapted to cool different components of the vehicle to maintain them within their optimal operating temperatures. Further, excess heat provided at the third circuit may be shed into the first and/or second circuits. The third circuit is downsized compared to a configuration where the third had no thermal exchanges with cooling circuit. Each circuit may also be filled with a coolant particularly suitable for the components coupled to it.

The following features, can be optionally implemented, separately or in combination one with the others.

The first cooling circuit comprises a first base circuit and a first auxiliary branch, a first selection valve configured to, in a base position, isolate the first auxiliary branch from the first base circuit and configured to, in an activated position, deviate all or a portion of a first coolant flow into the first auxiliary branch, wherein the selective heat exchanger arrangement comprises a first heat exchanger arranged on the first auxiliary branch for thermal coupling of the first cooling circuit with the third cooling circuit, when the first selection valve is in the activated position.

Thus, excess thermal energy within the third cooling circuit can be selectively shed into the first circuit.

The second cooling circuit L2 comprises a second base circuit and a second auxiliary branch, a second selection valve configured to, in a base position, isolate the second auxiliary branch from the second base circuit and configured to, in an activated position, deviate all or a portion of a second coolant flow into the second auxiliary branch, wherein the selective heat exchanger arrangement comprises a second heat exchanger arranged on the second auxiliary branch for thermally coupling the second cooling circuit with the third cooling circuit, when the second selection valve is in the activated position.

Thus, excess thermal energy within the third cooling circuit can be selectively shed into the second circuit.

The first coolant has a first operating temperature range, the second coolant has a second operating temperature range, the third coolant has a third operating temperature range, wherein the first operating temperature range is inferior to the second operating temperature range and the second operating temperature range is inferior to the third operating temperature range.

Thus, each circuit can operate at different temperature ranges. Each circuit may be associated to components with different operating temperatures.

The first or second selection valve switches to an activated position when the third coolant is outside the third operating temperature range.

Thus, the third cooling circuit can avoid reaching temperatures above its operating temperature range. The third cooling circuit may be downsized.

The third cooling circuit comprises a third base circuit and an auxiliary branch, there is provided a third selection valve configured to, in an activated position, deviate a portion of a third coolant flow from the third base circuit to the third auxiliary branch.

Thus, the third cooling circuit may be short-circuited to rapidly increase third coolant temperature during the cold start of the vehicle.

The third cooling circuit cools and/or heats the one or more fuel cells and/or warms a cabin of the vehicle. The third cooling circuit is thus associated with the vehicle component generating the most heat during operation.

The second cooling circuit cools and/or heats a power electronics module.

The first cooling circuit cools and/or heats the electrical storage devices such as battery.

The first, second and third selection valve is a 3 way valve, preferably a proportional flow control three way valve.

Thus, flow of coolant into the first, second and/or third auxiliary branches may be controlled, for example depending on temperatures of the first, second and third coolants.

There is provided, in each cooling circuit, a heat intake portion and a heat rejecting portion.

An air flow is configured to flow through, in order, the heat rejection portion of the first cooling circuit, the heat rejection portion of the second cooling circuit, and the heat rejection portion of the third cooling circuit.

Thus, the air flow can successfully extract heat from each of the first, second and third cooling circuits.

The first cooling circuit comprises an electric heater configured to speed up battery temperature rise.

In another aspect, it is proposed a method for the thermal management of a vehicle comprising the thermal management system of any of the preceding claims, comprising:

determining a temperature of the third cooling circuit
determining whether the third cooling circuit temperature is above an operating temperature range
if the third cooling circuit is above the operating temperature range, configure the selective heat exchanger arrangement, for selectively coupling thermally the third cooling circuit with the first cooling circuit and/or with the second cooling circuit, under predefined conditions.

In another aspect, it is proposed a vehicle comprising a fuel cell and a battery to power an electric motor of the vehicle, a power electronic module to control the electricity supply from the fuel cell and the battery to the electric motor and a thermal management system.

BRIEF DESCRIPTION OF DRAWINGS

Other features, details and advantages will be shown in the following detailed description and on the figures, on which.

DESCRIPTION OF EMBODIMENTS

Figures and the following detailed description contain, essentially, some exact elements. They can be used to enhance understanding the disclosure and, also, to define the invention if necessary.

Classically, a fuel cell powered vehicle, such as a car or truck, consists in one or more fuel cell stacks 12, a high-pressure hydrogen tank (not illustrated), a battery 16, at least one motor 14, at least one power electronics unit 18 and a thermal management system 20.

The fuel cell stacks 12 comprise of a number of individual fuel cells. Fuel cells consist of an electrolyte sandwiched between two electrodes, namely an anode and a cathode. In a Polymer Electrolyte Membrane (PEM) fuel cell, which is widely viewed as the most promising type of cell, hydrogen flows to the anode, where it is separated into protons and electrons. The protons are allowed to pass through the electrolyte to the cathode. However, the electrons are forced to follow an external circuit to said cathode. The flow of electrons travelling through the external circuit corresponds to electricity which can be used to power the vehicle. At the cathode side, oxygen is drawn from the environment to with bond the protons and electrons arriving at the cathode, forming water.

The hydrogen tank stores and provides hydrogen to the fuel cells. Alternatively, the hybrid vehicle may include a means of extracting hydrogen from a liquid hydrocarbon such as methanol or gasoline. This however requires extracting hydrogen from the liquid carbon, and adds cost and complexity to the vehicle.

The electric motor 14 uses the electricity produced by the fuel cell stack 12 and converts it into mechanical power. The electric motor 14 is coupled to vehicle traction wheels to propel the vehicle forward. Alternatively, the electric motor 14 may act as a generator, for example when the vehicle is moving downhill or braking, and converts mechanical power provided by the traction wheels into electricity.

The battery 16 may consist in a number of battery cells, stacked into modules. The battery may for example be a Li-ion battery, a lead acid battery or a Li-Metal or a Li-Polymer battery. The battery 16 stores electrical energy. On the one hand, the electricity stored can originate from the fuel cell stack 12. When the vehicle decelerates or is moving downhill, the fuel cell stack 12 may provide more electricity than required by the electric motor 14. On the other hand, the electricity stored can originate from the electric motor 14 acting as generator. As a result, when the energy demand required to move the vehicle is higher than that provided by the fuel cell stack 12, such as during an uphill climb, the energy stored in the battery 16 may assist or replace that provided by the fuel cell stack 12. Battery 16 may further be used for starting the vehicle, particularly until fuel cells 12 generate sufficient electricity to drive the vehicle.

The power electronics module 18 manages the fuel cell stack 12 and battery 16 electrical output and inputs in accordance with driving conditions and electricity availability. Thus, the power electronics 18 ensure that the electric motor 14 has sufficient energy to drive the traction wheels.

The thermal management system 20 is required to dissipate the heat produced by the fuel cell stacks 12, battery 14 and power electronic unit 18.

The components of thermal management system 20 according to the present invention will henceforth be described in more detail.

Figure 1:
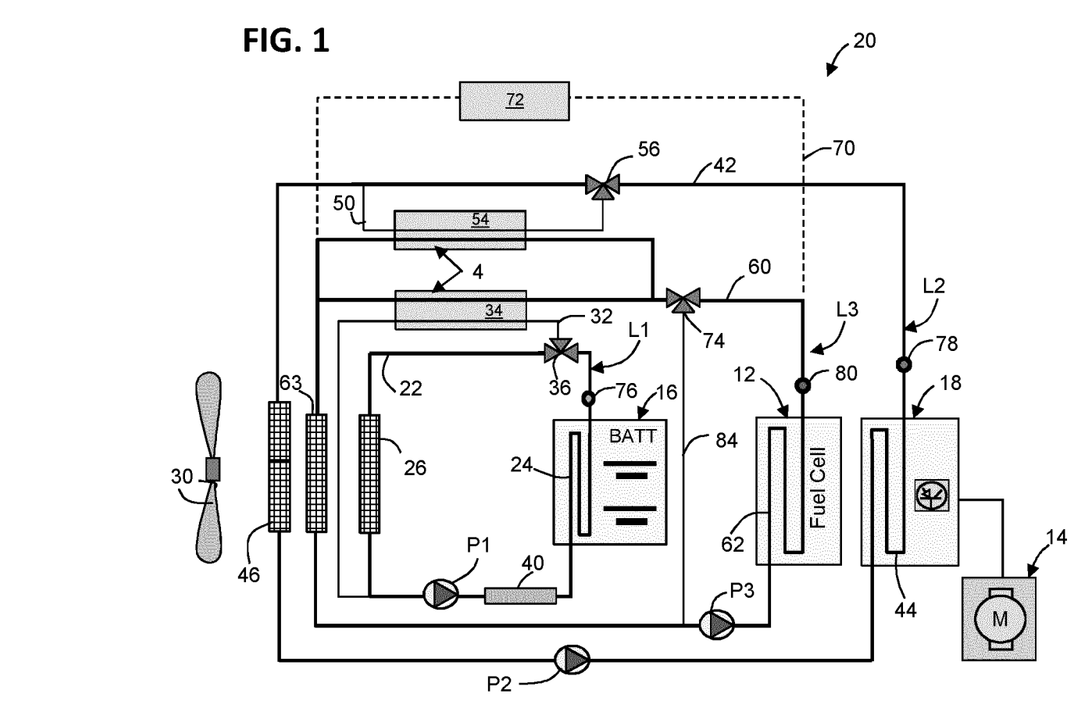
FIG. 1 is a diagrammatical circuit layout of a thermal management system according to the present disclosure, with 3 independent coolant circuits.

As visible in FIG. 1, the thermal management system 20 according to the invention comprises three independent cooling circuits L1, L2, L3. By independent, it is to be understood that each of the cooling circuits L1, L2, L3 are fluidically isolated. A first cooling circuit L1 is used for the continuous temperature equalization of the battery 16. A second cooling circuit L2 is used for the temperature management of the power electronics module 18. A third cooling circuit L3 is used for the heating and cooling of the fuel cell stack 12. The use of three circuits is advantageous as it allows each individual circuit L1, L2, L3 to maintain their associated components at an optimal operating temperature.

The first cooling circuit L1 comprises a first base circuit 22 coupled to the battery 16. The first base circuit 22 includes a first pump P1, a heat intake portion 24, a heat rejection portion 26 and a heater 40. Thus, a first coolant C1 can flow through the first base circuit 22 to successively absorb and reject heat.

The first coolant C1 is a liquid suitable to act as a heat transfer medium. For example a first coolant C1 may be glycol loaded water or glycolated water.

Figure 5:
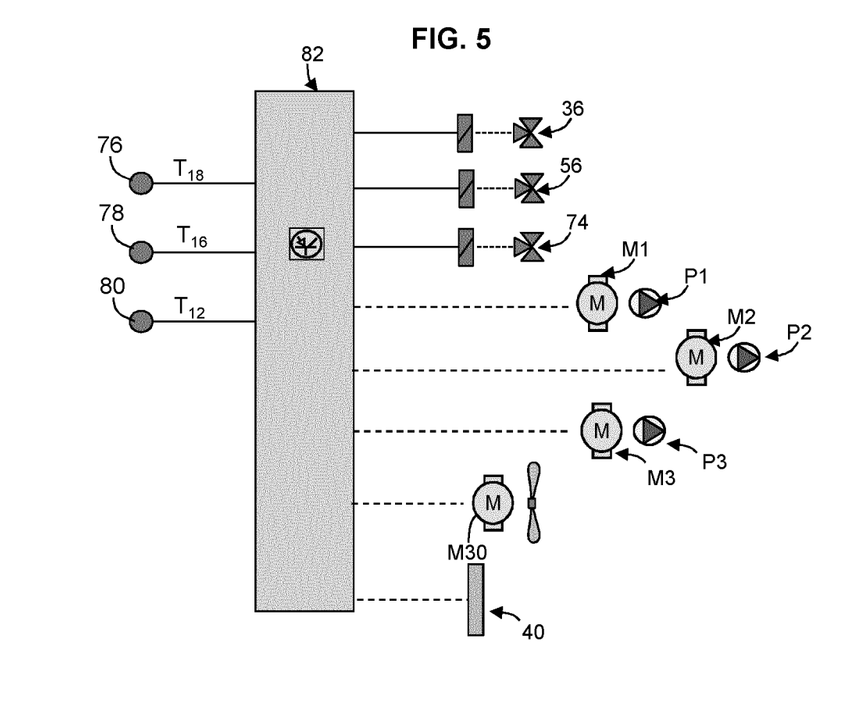
FIG. 5 is a system block diagram.

As visible in FIG. 5, the first pump P1 is driven by a first motor M1. The operation of the first motor M1 is controlled by a controller 82. The controller 82 receives temperature data from a temperature sensor 76 within the first cooling circuit L1. Thus, the motor M1 drives the first pump P1 to flow first coolant C1 through the first cooling circuit L1.

The heat intake portion 24 describes the region where the first base circuit 22 is thermally coupled to the battery 16. For example, the heat intake portion 24 may snake through the cells and/or modules of the battery 16. Such a configuration increases the area in which the first coolant C1 is thermally coupled to the battery 16.

Figure 4:
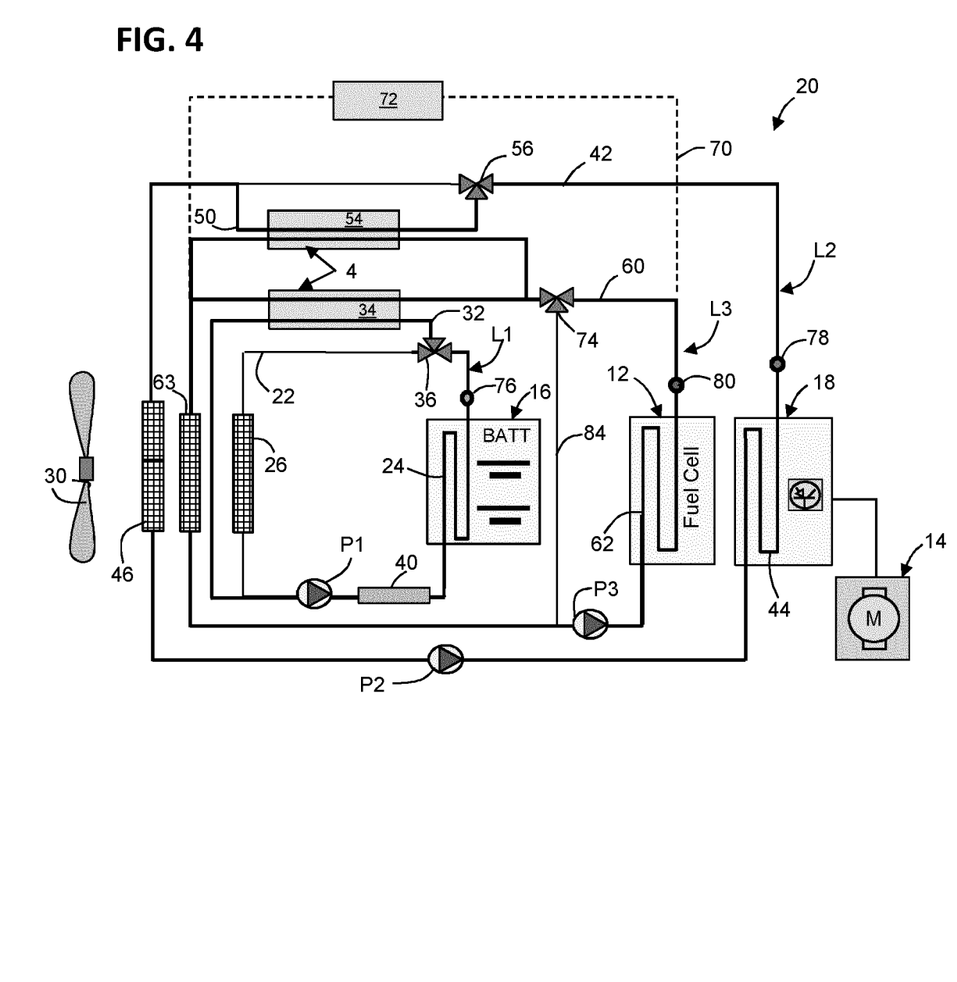
FIG. 4 is analogous to FIG. 1 and illustrates a circuit layout of a thermal management system with heat transfer between coolant circuits.

The heat rejection portion 26 describes the region where the first base circuit 12 is thermally coupled to a radiator. Here, the first coolant C1 flows through a radiator to discharge the heat extracted from the battery 16. The radiator may for example consist of a metal channels through which the coolant can flow. The channels are arranged to face a fan 30, which generates a flow of air to interact with the first coolant C1 flowing though the radiator channels. The fan 30 may for example be a pull fan or a push fan. As shown in FIG. 4, the fan 30 is driven by a motor M30. The operation of the motor M30 is controlled by the controller 82.

As shown in FIG. 5, the heater 40 is driven by the controller 82. The heater 40 may for example be an electric heater. The controller 82 receives temperature data from the temperature sensor 76. Thus, the heater 40 can heat the first coolant C1 when necessary, such as the cold start of a vehicle.

The first cooling circuit L1 further comprises an auxiliary branch 32. The auxiliary branch 32 links the first cooling circuit L1 to a heat exchanger 34. The flow of the first coolant C1 into the auxiliary branch 12 is controlled by a selection valve 36, in this case a three way valve. As illustrated in FIG. 5, the three way valve 36 may for example be controlled by the controller 82. The three way valve may have proportional flow control, and the amount of first coolant C1 through the auxiliary branch 32 may be controlled.

The second cooling circuit L2 comprises a second base circuit 42 coupled to the power electronics module 18. The second base circuit 42 includes a second pump P2, a heat intake portion 44 and a heat rejection portion 46. Thus, a second coolant C2 can flow through the second base circuit 42 to successively absorb and reject heat.

The second coolant C2 is a liquid suitable to act as a heat transfer medium. For example a second coolant C2 may be glycol loaded water or glycolated water.

As visible in FIG. 5, the second pump P2 is driven by a second motor M2. The operation of the second motor M2 is controlled by the controller 82. The controller 82 receives temperature data from a temperature sensor 78 within the second cooling circuit L2. Thus, the motor M2 drives the second pump P2 to flow coolant through second cooling circuit L2.

The heat intake portion 44 describes the region where the second base circuit 42 is thermally coupled to the power electronics module 16. For example, the power electronics module 18 may be mounted on a cooling plate provided with channels through which the second coolant C2 can flow. The plate may for example be in a metallic material to facilitate the heat exchange from the power electronics module 18 to the second coolant C2.

The heat rejection portion 46 describes the region where the second base circuit 42 is thermally coupled to a radiator. Here, the second coolant C2 flows through the radiator to discharge the heat extracted from the power electronics module 18. The radiator may for example consist of a metal channels through which the coolant can flow. The channels may be arranged to face the fan 30. Use of a single fan 30 reduces the number of components involved in the thermal management system 20, limiting its cost, size and weight.

The second cooling circuit L2 further comprises an auxiliary branch 50. The auxiliary branch 50 links the second cooling circuit L2 to a heat exchanger 54. The flow of the second coolant C2 into the auxiliary branch 50 is controlled by a selection valve 56, in this case a three way valve. As illustrated in FIG. 5, the three way valve 56 may for example be controlled by the controller 82. The three way valve may The three way valve may have proportional flow control, and the amount of second coolant C2 through the auxiliary branch 50 may be controlled.

The third cooling circuit L3 comprises a third base circuit 60 coupled to the fuel cell stacks 12. The third base circuit 60 includes a third pump P3, a heat intake portion 62, a heat rejection portion 64 and selective heat transfer arrangement 4. Thus, a third coolant C3 can flow through the third base circuit 60 to successively absorb and reject heat.

The third coolant C3 is a liquid suitable to act as a high efficiency heat transfer medium. For example, a third coolant C3 may be a deionized cooling liquid. The third coolant is therefore particularly adapted to fuel cell cooling.

As visible in FIG. 4, the third pump P3 is driven by a third motor M3. The operation of the third motor M3 is controlled by the controller 82. The controller 82 receives temperature data from a temperature sensor 80 within the third circuit 12. Thus, the third motor M3 may drive the third pump P3 to flow sufficient third coolant C3 through the fuel cell stacks 12 to maintain ideal operating temperatures, as will be described later.

The heat intake portion 62 describes the region where the third base circuit 60 is thermally coupled to the fuel cell stacks 12. For example, the third base circuit 60 may snake through the fuel cells. Such a configuration increases the area in which the third coolant C3 is thermally coupled to the fuel cell stack 12.

The heat rejection portion 63 describes the region where third base circuit 60 is thermally coupled to a radiator. Here, the third coolant C3 flows through the radiator to discharge the heat extracted from the fuel cell stack 12. The radiator may for example consist of a metal channels through which the coolant can flow. The channels may be arranged to face the same fan 30 as the first and second cooling circuits L1, L2, to further reduce size, weight and cost of the thermal management system.

It should be noted that the radiator of the third circuit L3 is placed downstream of the air flow generated by the fan 30. Thus, the air flow from the fan 30 first extracts heat from the first and second cooling circuits L1, L2, before extracting heat from the third cooling circuit L3. Indeed, the third coolant C3 typically has the highest temperature and would significantly heat the air flow provided by the fan 30.

The selective heat transfer arrangement 4 describes the area where the third coolant C3 flows through the heat exchanger 34 of the first circuit L1 and the heat exchanger 54 of the second circuit L2. Here, the heat exchanger 34 of the first circuit L1 and the heat exchanger 54 of the second circuit L2 are placed in parallel. Alternatively, the heat exchangers 34,54 may be in series, or located at separate locations on the third cooling circuit L3.

The third cooling circuit L3 further comprises an auxiliary branch 84. The auxiliary branch 84 bypasses the selective heat transfer arrangement 4 and the heat rejection portion 63 of the third cooling circuit L3. The flow of third coolant C3 into the auxiliary branch 84 is controlled by a selection valve 74, in this case a three way valve. As illustrated in FIG. 4, the three way valve 56 may for example be controlled by the controller 82. The three way valve may The three way valve may have proportional flow control, and the amount of third coolant C3 through the auxiliary branch 50 may be controlled.

The third cooling circuit L3 further comprises a branch 70. The branch 70 links the third cooling circuit L3 to a heating, ventilation and cooling system (HVAC) 72, to manage the temperature within the cabin of the vehicle. Thus, the thermal management system 20 can participate in cabin temperature management, reducing costs and components required for the HVAC system.

The normal operation of the thermal management system 20 will now be described in more detail.

Under normal operating conditions, each of the first, second and third cooling circuits L1, L2, L3 may cool their associated components independently from one another.

In normal operating conditions, as shown in FIG. 1, three way valve 74 of the third cooling circuit L3 is in a base position. Third coolant C3 flows through the base circuit 60. Further, the three way valves 36, 56 of the first and second circuit L1 and L2 are in a base position. No flow of first and second coolants C1, C2, pass the auxiliary branches 32, 50 of the first and second circuits L1, L2. The first, second, and third circuits L1, L2, L3 are fully isolated from one another. By fully isolated, it is to be understood that the circuits are both fluidically and thermally isolated.

Figure 6:
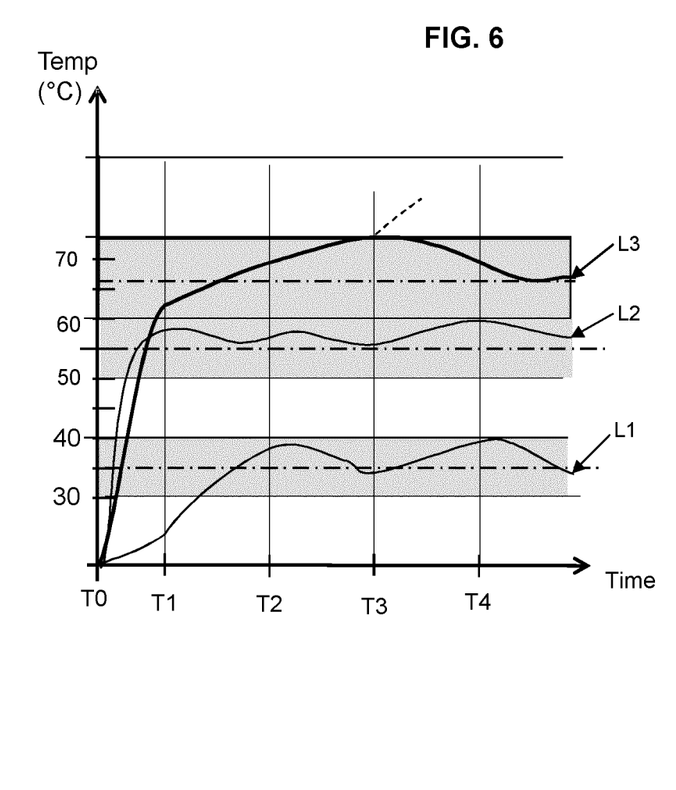
FIG. 6 shows a time chart exhibiting temperature.

The temperature sensor 76 within the first cooling circuit L1 measures a temperature representative of battery temperature $T_{16}$. Temperature sensor 76 may for example be placed in the vicinity of first coolant flowing out of the battery 16. As shown in FIG. 6, battery temperature $T_{16}$ fluctuates. This is due to the demands on the battery 16 to provide or store energy for the electric motor 14 of the vehicle.

The temperature sensor 76 sends data to the controller 82. The controller 82 may verify that the battery 16 is within an operating temperature range, here between 30° C. and 40° C. The controller 82 further verifies whether the battery temperature $T_{16}$ is above or below the operating temperature range.

In the case that battery temperature $T_{16}$ is above its operating temperature range, the controller 82 may drive the first motor M1 to increase the flow of coolant C1 through the battery 16. In addition, the controller 82 may drive the motor fan 30 to increase heat exchanges at the heat rejection portion 26 of the first circuit L1. In the case that battery temperature $T_{16}$ is below its operating temperature range, the controller 82 may drive the first motor M1 to reduce the flow of coolant C1 through the battery 16. Alternatively or in addition, the controller 82 may activate the heater 40 to heat first coolant C1 temperature as in a cold start of the vehicle described later.

In parallel, the temperature sensor 78 within the second cooling circuit L2 measures a temperature representative of power electronics module temperature $T_{18}$. Temperature sensor 78 may for example be placed in the vicinity of first coolant flowing out of the power electronics module 18. As previously, electronics module temperature $T_{18}$ fluctuates. Temperature $T_{18}$ is generally higher than that of the battery 16, as the power electronics module 18 may generate more heat during operation.

The temperature sensor 78 sends data to the controller 82. The controller 82 may verify that the power electronics module 18 is within an operating temperature range, here between 50° C. and 60° C. The controller 82 further verifies whether the power electronics module temperature $T_{18}$ is above or below its operating temperature range.

In the case that power electronics module temperature $T_{18}$ is above its operating temperature range, the controller 82 may drive the second motor M2 to increase the flow of coolant C2 through the power electronics module 18. In addition, the controller 82 may drive the fan 30 faster to increase heat exchanges at the heat rejection portion 46 of the second circuit L3. Similarly, in the case that power electronics module temperature $T_{18}$ is below its operating temperature range, the controller 82 may drive the second motor M2 to reduce the flow of coolant C2 through the power electronics module 18.

Figure 3:
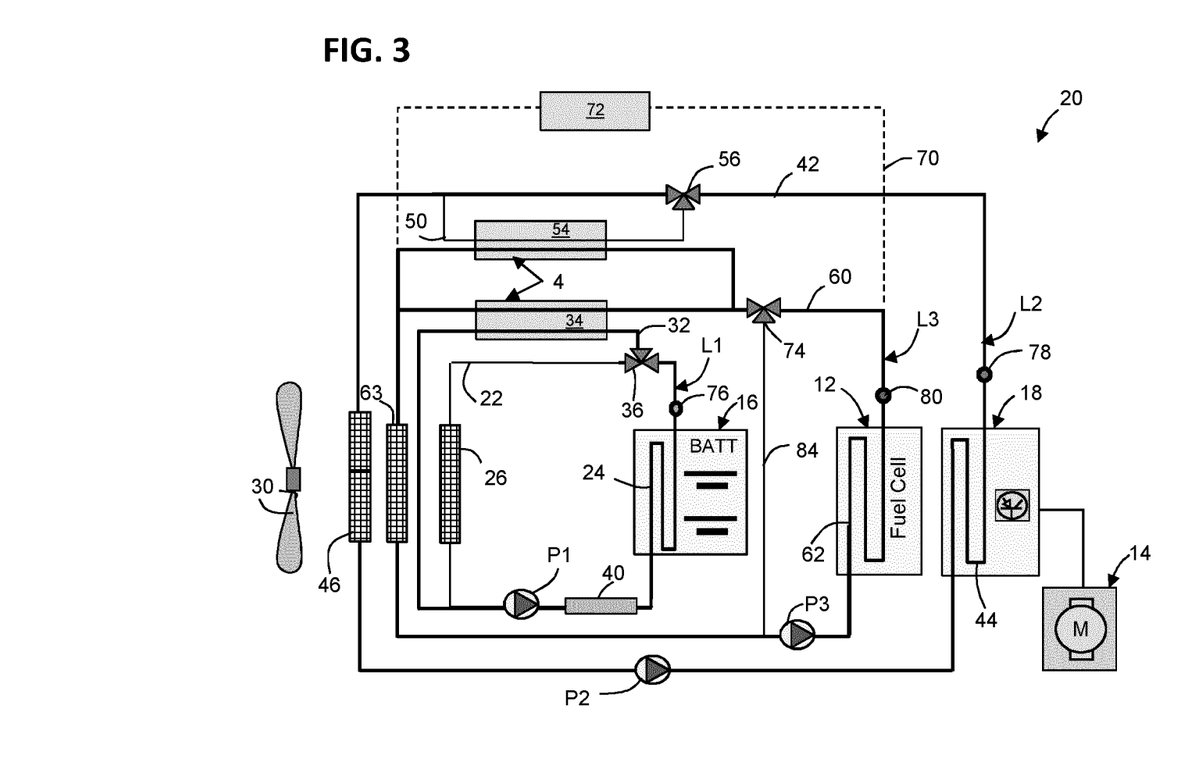
FIG. 3 is analogous to FIG. 1 and illustrates a circuit layout of a thermal management system with heat transfer between coolant circuits during a second stage of the cold start of a vehicle.

In parallel, the temperature sensor 80 within the third cooling circuit measures a temperature representative of fuel cell stack 12 temperature $T_{12}$. Temperature sensor 80 may for example be placed in the vicinity of first coolant flowing out of the fuel cell stacks 12. As shown in FIG. 3, fuel cell stack temperature $T_{12}$ fluctuates. This is due to the demands on the fuel cell stack 12 to provide energy for the electric motor 14 of the vehicle.

The temperature sensor 80 sends data to the controller 82. The controller 82 may verify that the fuel cell stack 12 is within its operating temperature range, here between 60° C. and 70° C. The higher operating temperature range is due to the reactions occurring in the fuel cells, which generate a high amount of heat. The controller 82 further verifies whether the fuel cell stack 12 temperature $T_{12}$ is above or below its operating temperature range.

In the case that the fuel cell stack temperature $T_{12}$ is above its operating temperature range, the controller 82 may drive the third motor M3 to increase the flow of coolant C3 through the fuel cell stack 12. In addition, the controller 82 may drive the fan 30 faster to increase heat exchanges at the heat rejection portion 66 of the third circuit L3. Similarly, in the case that fuel cell stack temperature $T_{12}$ is below its operating temperature range, the controller 82 may drive the third motor M3 to reduce the flow of coolant C3 through the fuel cell stack 12. Alternatively or in addition, the three way valve may be placed in an activated position. All or party of the third coolant C3 may flow through the auxiliary branch 84, as described during the cold start of the vehicle.

The condition where the fuel cell stack 12 reaches temperatures above its optimal range will now be described in more detail.

As visible in FIG. 6, at T3, the fuel cell stack temperature sensor 80 measures a fuel cell stack temperature $T_{12}$ above its operating temperature range. In such a case, the third cooling circuit L3 cannot extract sufficient heat to return fuel cell stack temperature $T_{12}$ within its operating range. In turn, this could damage the fuel cell stack 12.

The controller 82 may turn both of the three way valves 36, 56 of the first and second cooling circuits L1, L2 into an activated position. In the activated position, as illustrated in FIG. 4, flow of the first and second coolants C1, C2, pass through the auxiliary branches 32, 50. Thus, the third circuit L3 is thermally coupled to the auxiliary branch 32 of the first circuit L1 and the auxiliary branch 50 of the second circuit L2 through heat exchangers 34, 54. The third coolant C3 may therefore reject heat into the first and second cooling circuits L1, L2.

Alternatively, the controller 82 may turn one of the three way valves 36, 56 into the activated position. The decision of the controller 82 to place one or both of the three way valves 36, 56 in an activated position may be based on the temperature $T_{12}$ of the fuel cell stack 12 relative to the temperatures of the battery 16 and the power electronics module 18. In general, controller 82 may turn one or both of the three way valves 36, 56 to maintain each of the battery 16 and power electronics module 18 within their individual operating temperature ranges.

In addition, controller 82 may only partly turn one or both of the three way valves 36, 56 into the activated position. Thus, controller 82 may precisely regulate the amount of heat rejected from the third coolant C3 into the first and/or second coolants C1, C2. This enables a fine control of the heat exchanges between each of the cooling circuits L1, L2, L3.

It should be noted that the controller 82 may also turn either one or two of the three way valves 36, 56 of the first and second cooling circuits L1, L2 into an activated position based on other predefined conditions. For example, temperature sensors 76, 78, 80 may be placed at different locations within the first, second and third cooling circuits respectively. Temperature sensors 76, 78, 80 may then measure coolant C1, C2, C3 temperatures before flowing through vehicle components and/or before flowing through heat rejection portions 26, 46, 63.

As visible in FIG. 6, the change of either one or both of the three way valves 36, 56 into the activated position enables the third cooling circuit L3 to rapidly return within its operating temperature range. Therefore, the coupling of the third cooling circuit L3 to either one or both of the cooling circuits L1, L2 enables temperature control of the third circuit L3. When the third cooling circuit L3 returns within its operating temperature range, the thermal management system 20 returns to its normal operating conditions.

Advantageously, the use of the heat exchangers 34, 54 to reduce the temperature of the fuel cell stack 12 reduces the heat rejection requirements of the third cooling circuit L3 by the fan 30 and the heat rejection portion 66. The third cooling circuit L3 may therefore be downsized, reducing the size, cost and weight of the overall thermal management system 20.

The cold start of a vehicle will now be described in more detail.

As visible in FIG. 6, between TO and T2, each of the components of the fuel cell vehicle must increase their temperatures to reach their ideal operating temperature. This corresponds to the cold start of a vehicle.

Figure 2:
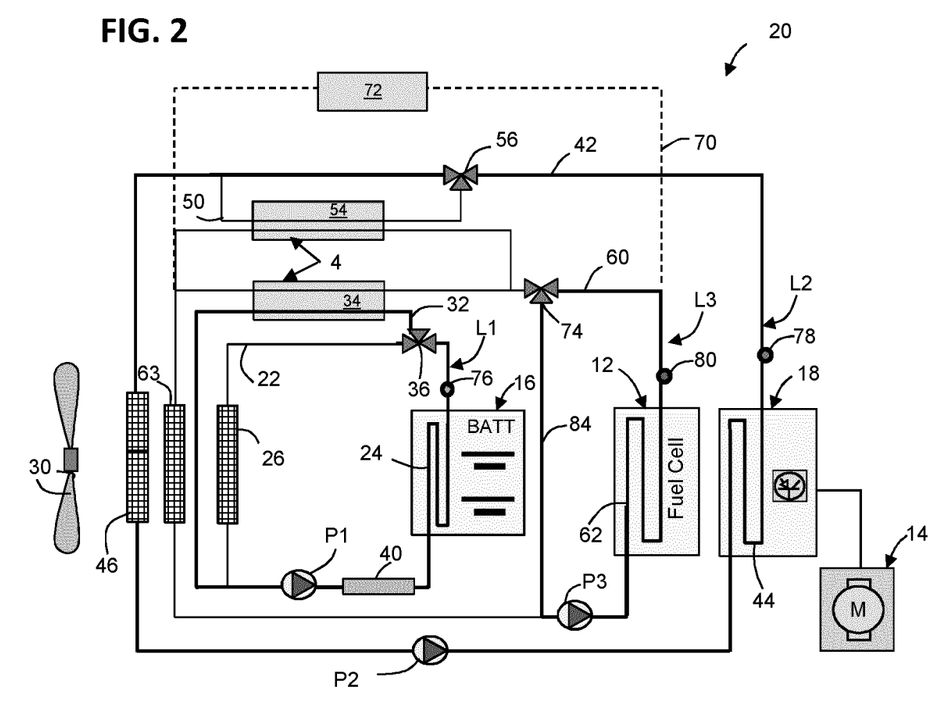
FIG. 2 is analogous to FIG. 1 and illustrates a circuit layout of a thermal management system during a first stage of the cold start of a vehicle.

A first heating stage, between TO and T1, is illustrated in FIG. 2. Here, the controller 82 turns the three way valve 74 of the third cooling circuit L3 into the activated position. Third coolant C3 flows through the auxiliary branch 84. Thus, third coolant C3 bypasses the heat rejection portion 63 of the third cooling circuit L3. In addition, fuel cells 12 generate a high amount of heat during operation. Thus, the fuel cell stack 12 rapidly reaches its operating temperature. In addition, the controller 82 activates the heater 40 of the first cooling circuit L2. This favors a quick temperature increase of the battery 16.

A second heating stage, between T1 and T2, is illustrated in FIG. 3. Here, the controller 82 has returned the three way valve 74 of the third cooling circuit L3 into the base position. Third coolant C3 flows through the base circuit 60, and in particular through the heat exchanger 34. Controller 82 further turns the three way valve 36 of the first cooling circuit L1 into the activated position. First coolant C1 flows through the auxiliary branch 32. Thus, the third circuit L3 is thermally coupled to the auxiliary branch 32 of the first cooling circuit L1 through heat exchanger 34. The first coolant C1 intakes heat from the third coolant C3. This decreases the time taken by the battery 16 to reach its operating temperature range. Thus, the use of heat exchanger 34 to increase battery temperature reduces the requirements of the heater 40. The first cooling circuit L1 may therefore be downsized, reducing the size, cost and weight of the overall thermal management system 20.

The description of this embodiment is an example for describing the present invention, and does not limit the invention described in the claims.

Figure 7:
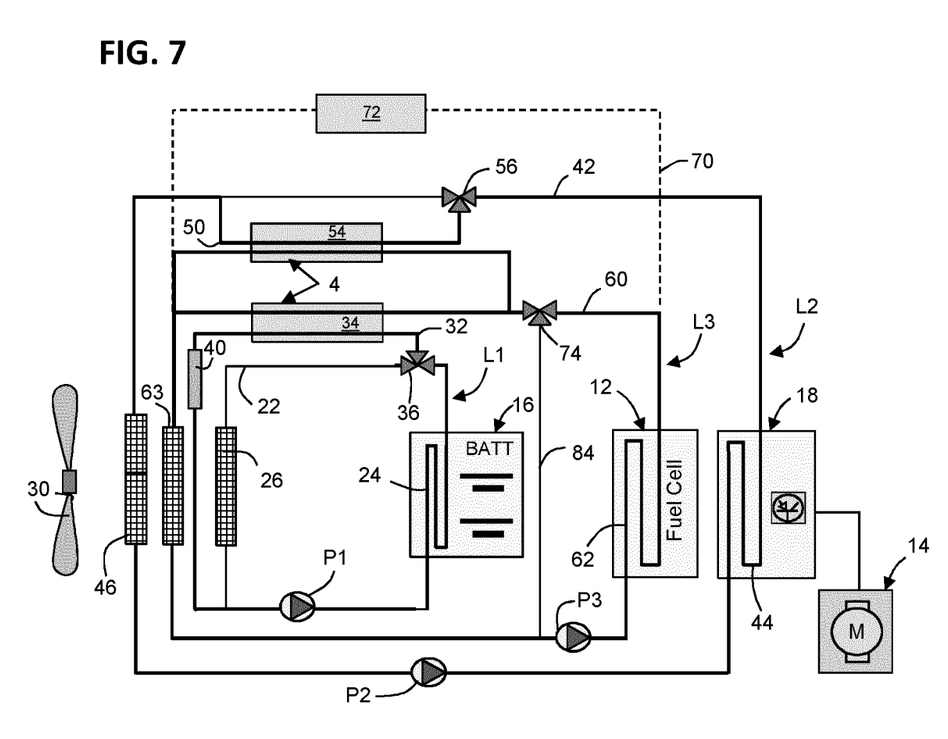
FIG. 7 illustrates a second embodiment of a circuit layout of a thermal management system with heat transfer between coolant circuits.

In an alternative embodiment, illustrated in FIG. 7, heater 40 is placed on the auxiliary branch 32 of the first cooling circuit L1. Auxiliary branch 32 further bypasses the heat rejection portion 26 of the first cooling circuit L1. Thus, the auxiliary branch 32 optimizes the heating of the battery 32. In parallel, due to the lower operating temperature range of the battery 16 in relation to the fuel cell stack 12, heat exchanger 34 may still be used for fuel stack 12 cooling.

Figure 8:
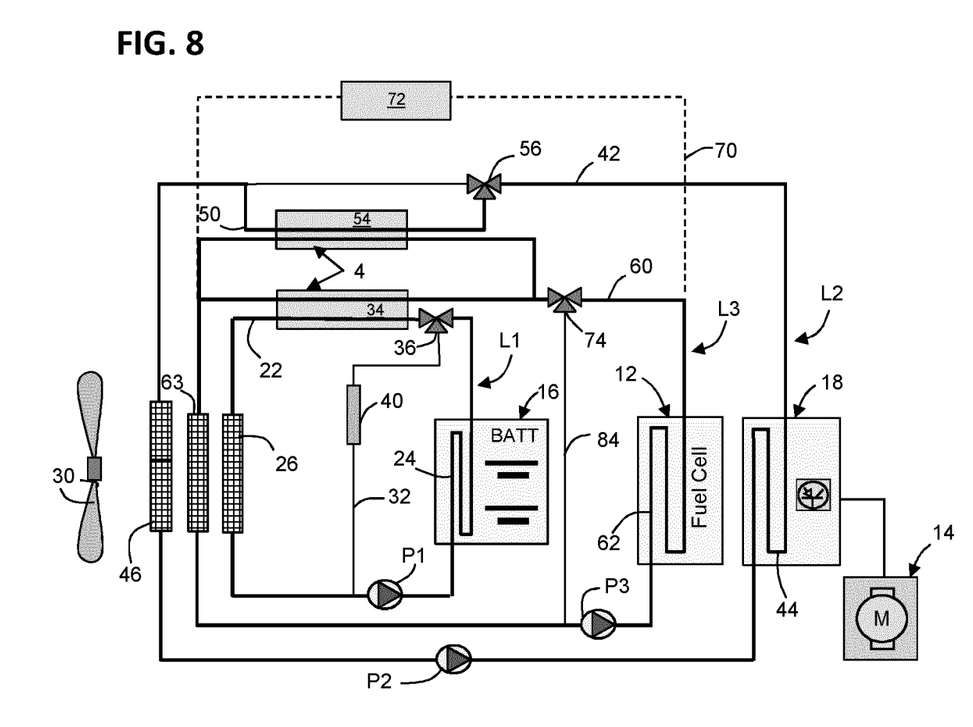
FIG. 8 illustrates a third embodiment of a circuit layout of a thermal management system with heat transfer between coolant circuits.

In another alternative embodiment, illustrated in FIG. 8, heater 40 is placed on the auxiliary branch 32 of the first cooling circuit L1. Heat exchanger 34 is placed on the base circuit 22 of the first cooling circuit L1. Thus, the heater 40 can be used in isolation to heat the battery 12 during the cold start of the vehicle. Base circuit 22 of the first cooling circuit L1 is thus better adapted for the cooling of fuel stacks 12.

The invention claimed is:

1. A thermal management system for a vehicle comprising one or more fuel cells, the system comprising:
   a first cooling circuit filled with a first coolant, having at least a first pump, a second cooling circuit filled with a second coolant, having at least a second pump, and a third cooling circuit filled with a third coolant, having at least a third pump, wherein the first, second, and third cooling circuits are fluidically independent from one another, and wherein there is provided at least a selective heat exchanger arrangement, for selectively coupling thermally the third cooling circuit with the first cooling circuit and/or with the second cooling circuit, under predefined conditions.

2. The thermal management system of claim 1, wherein: the first cooling circuit comprises:
   a first base circuit,
   a first auxiliary branch, and
   a first selection valve configured to, in a base position, isolate the first auxiliary branch from the first base circuit and configured to, in an activated position, deviate all or a portion of a first coolant flow into the first auxiliary branch,
wherein the selective heat exchanger arrangement comprises a first heat exchanger arranged on the first auxiliary branch for thermal coupling of the first cooling circuit with the third cooling circuit, when the first selection valve is in the activated position.

3. The thermal management system of claim 1, wherein: the second cooling circuit comprises:
   a second base circuit,
   a second auxiliary branch, and
   a second selection valve configured to, in a base position, isolate the second auxiliary branch from the second base circuit and configured to, in an activated position, deviate all or a portion of a second coolant flow into the second auxiliary branch,
wherein the selective heat exchanger arrangement comprises a second heat exchanger arranged on the second auxiliary branch for thermally coupling the second cooling circuit with the third cooling circuit, when the second selection valve is in the activated position.

4. The thermal management system of claim 2, wherein: the first coolant has a first operating temperature range, the second coolant has a second operating temperature range, and
the third coolant has a third operating temperature range, wherein the first operating temperature range is inferior to the second operating temperature range and the second operating temperature range is inferior to the third operating temperature range.

5. The thermal management system of claim 4, wherein the first or the second selection valve switches to an activated position when the third coolant is outside the third operating temperature range.

6. The thermal management system of claim 1, wherein: the third cooling circuit comprises:
   a third base circuit,
   an auxiliary branch, and
   a third selection valve configured to, in an activated position, deviate a portion of a third coolant flow from the third base circuit to the third auxiliary branch.

7. The thermal management system of claim 1, wherein the third cooling circuit cools and/or heats the one or more fuel cells and/or warms a cabin of the vehicle.

8. The thermal management system of claim 1, wherein the second cooling circuit cools and/or heats a power electronics module.

9. The thermal management system of claim 1, wherein the first cooling circuit cools and/or heats one or more electrical storage devices such as a battery.

10. The thermal management system of claim 6, wherein: the first, second, and third selection valves are 3-way valves, preferably proportional flow control 3-way valves.

11. The thermal management system of claim 1, wherein there is provided, in each cooling circuit, a heat intake portion and a heat rejecting portion.

12. The thermal management system of claim 11, wherein an air flow is configured to flow through, in order:
   the heat rejection portion of the first cooling circuit,
   the heat rejection portion of the second cooling circuit, and
   the heat rejection portion of the third cooling circuit.

13. The thermal management system of claim 1, wherein the first cooling circuit comprises an electric heater configured to speed up battery temperature rise.

14. A method for the thermal management of a vehicle comprising the thermal management system of claim 1, comprising:
   determining a temperature of the third cooling circuit,
   determining whether the third cooling circuit temperature is above an operating temperature range, and
   if the third cooling circuit is above the operating temperature range, configuring the selective heat exchanger arrangement, for selectively coupling thermally the third cooling circuit with the first cooling circuit and/or with the second cooling circuit, under predefined conditions.

15. A vehicle comprising:
   a fuel cell,
   a battery to power an electric motor of the vehicle, and
   a power electronic module to control an electricity supply from the fuel cell and the battery to the electric motor and the thermal management system of claim 1.

* * * * *